Figure 1:
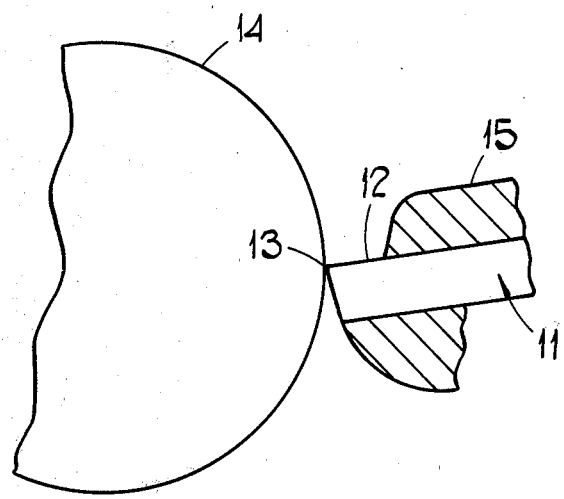

United States Patent [19]

Lumby et al.

[11] 4,323,323
[45] Apr. 6, 1982

[54] TOOL TIP FOR A MACHINE TOOL

[75] Inventors: Roland J. Lumby, Selly Oak; Bernard North, Stirchley; Alfred J. Taylor, Solihull; Roland M. Thomas, Hollywood, all of England

[73] Assignee: Lucas Industries Limited, Birmingham, England

[21] Appl. No.: 91,506

[22] Filed: Nov. 5, 1979

Related U.S. Application Data

[63] Continuation of Ser. No. 30,474, Apr. 16, 1979, abandoned, which is a continuation of Ser. No. 885,449, Mar. 10, 1978, abandoned.

[30] Foreign Application Priority Data

Mar. 17, 1977 [GB] United Kingdom ............... 11298/77

[51] Int. Cl.$^3$ .............................................. B26D 1/00
[52] U.S. Cl. .................................. 407/119; 76/101 R; 501/154; 501/73; 501/97; 501/98
[58] Field of Search .................... 106/73.2, 73.4, 73.5, 106/65; 428/119, 539; 407/119; 76/101 R

[56] References Cited

U.S. PATENT DOCUMENTS

| | | | |
|---|---|---|---|
| 3,977,061 | 8/1976 | Lindstrom et al. | 407/119 |
| 3,991,148 | 11/1976 | Lumby et al. | 106/73.5 |
| 3,991,166 | 11/1976 | Jack et al. | 407/119 |
| 3,993,844 | 11/1976 | Kiger et al. | 106/73.2 |
| 4,071,371 | 1/1978 | Milberg et al. | 407/119 |
| 4,097,293 | 6/1978 | Komeya et al. | 106/73.2 |
| 4,113,503 | 9/1978 | Lumby et al. | 407/119 |
| 4,127,416 | 11/1978 | Lumby et al. | 106/73.5 |
| 4,203,690 | 5/1980 | Tanaka et al. | 407/119 |
| 4,227,842 | 10/1980 | Samanta et al. | 407/119 |

FOREIGN PATENT DOCUMENTS 2346586 of 1973 Fed. Rep. of Germany.
45-129804 of 1970 Japan.
48-25484 of 1973 Japan.

*Primary Examiner*—Leonidas Vlachos
*Attorney, Agent, or Firm*—Holman & Stern

[57] ABSTRACT

A cutting tool tip is formed at least at a cutting edge of the tip from a ceramic product consisting essentially of at least 75% by volume of a single phase compound having an expanded β-phase silicon nitride lattice and having the general formula $Si_{6-z}Al_zN_{8-z}O_z$, where $0 < z \leq 5$, together with a second phase containing a metal from the list yttrium, lanthanum, cerium and scandium, or other rare earth metal.

10 Claims, 2 Drawing Figures

TOOL TIP FOR A MACHINE TOOL

This is a continuation of application Ser. No. 030,474, filed Apr. 16, 1979, now abandoned, which in turn is a Continuation of U.S. Ser. No. 885,449 filed Mar. 10, 1978, now abandoned.

BACKGROUND OF THE INVENTION

1. Field Of The Invention

This invention relates to a cutting tool tip for a machine tool.

2. Description Of The Prior Art

At present, cutting tool tips for machining workpieces formed of hard metals and alloys, such as hard steels, are normally produced from alumina and tungsten carbide-based materials. It is, however, found that these known tool tips have an undesirably short working life when used in certain onerous applications with this type of workpiece, particularly in single point turning (that is where the tool is held against rotation while the workpiece rotates), and in rotary turning where repeated interruptions are encountered in the turning operation. As a result of investigations which have been carried out to alleviate this disadvantage, it has now been found that a cutting tool tip having an improved working life as compared with the known alumina and tungsten carbide-based tips can be obtained by forming at least the cutting edge of the tip from a ceramic product consisting essentially of at least 75% by volume of a single phase compound having an expanded $\beta$-phase silicon nitride lattice and the general formula $Si_{6-z}Al_zN_{8-z}O_z$ where $0<Z\leq 5$, together with a second phase containing a metal from the list yttrium, lanthanum, cerium and scandium, or other rare earth metal.

SUMMARY OF THE INVENTION

Accordingly, the invention resides in a cutting tool tip formed at least at a cutting edge of the tip from a ceramic product consisting essentially of at least 75% by volume of a single phase compound having an expanded $\beta$-phase silicon nitride lattice and having the general formula $Si_{6-z}Al_zN_{8-z}O_z$, where $0<z\leq 5$, together with a second phase containing a metal from the list yttrium, lanthanum, cerium and scandium, or other rare earth metal.

Preferably, the expanded $\beta$-phase compound having the general formula $Si_{6-z}Al_zN_{8-z}O_z$ is present in an amount of at least 85% by volume.

Preferably, the z value of the expanded $\beta$-phase compound having the general formula $Si_{6-z}Al_zN_{8-z}O_z$ is greater than 0 and less than or equal to 1.0.

Conveniently, said second phase is a glass phase with said metal being present as a metal silicate.

Preferably, the ceramic product is produced by a sintering operation in the absence of applied pressure.

Figure 2:
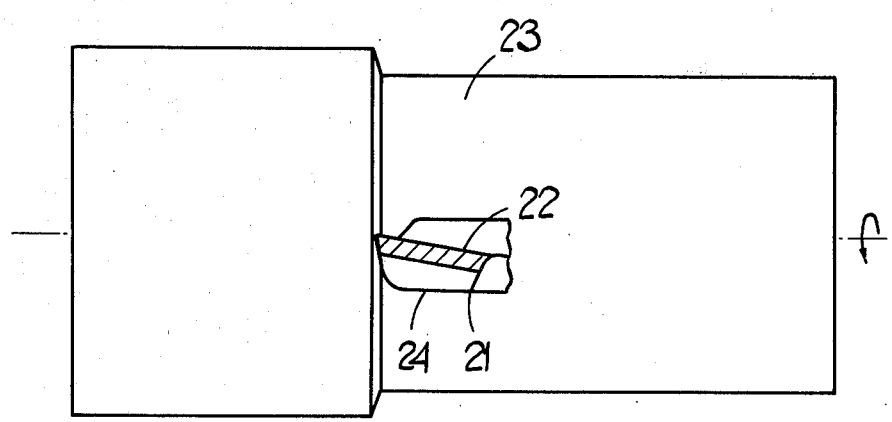

In the accompanying drawings,

FIG. 1 is a sectional view of a tool tip, according to a first example of the invention, when being used to effect a single point turning operation on a circular workpiece, and FIG. 2 is a diagrammatic illustration of a tool tip, according to a second example of the invention, when being used to effect a single point turning operation on a cylindrical workpiece.

Referring to FIG. 1, the tool tip is shown at 11 and is generally in the form of a right cuboid which is 8 mm high and which in transverse cross section defines a square having 12.7 mm sides. One square end surface 12 of the tip is provided along each of its sides with a 45° chamfer which reduces the length of each side by 0.2 mm. In addition, the corners of said end surface 12 are rounded so as to define four cutting edges 13 (only one shown) each lying on a circle of radius 1.2 mm. Thus, in use, the tip 11 is indexable between four angularly spaced cutting positions in each of which one of said cutting edges is presented to the workpiece being machined. In addition, it is to be appreciated that the configuration of the tip 11 is such that is complies with the International Standards Organisation designation SNGN 120812.

The tip is produced from a mixture of 42 parts by weight of aluminium powder as supplied by The Aluminium Company of America with a particle size of about 20 microns with 14 parts by weight of silicon powder as supplied by Union Carbide Limited with an average particle size of 3 microns and 44 parts by weight of alumina powder as supplied by Linde as Type B and having a nominal particle size of 0.05 microns. The mixture is placed in an alumina boat and positioned in a nitriding furnace, into which is introduced an atmosphere consisting of 64%, by volume nitrogen, 6% by volume hydrogen and 30% by volume argon. In the furnace the mixture is subjected to a heating process consisting of the following stages:

(a) raising the temperature at a rate of 100° C./hour to 500° C. and holding for 24 hours, (b) increasing the temperature at said rate from 500° C. to 1200° C. and holding for 24 hours, (c) further increasing the temperature at said rate to 1300° C. and holding for eight hours and, (d) still further increasing the temperature at said rate to 1350° C. and holding for 16 hours. After completion of the heating process, the sintered material is allowed to cool and is then removed from the furnace and buried in boron nitride powder in a graphite pot. The temperature of the pot is then raised in 1 hour from room temperature to 1500°–1900° C., preferably 1800° C., and then held at this temperature for 1 hour. Apart from some unconverted oxide, the resultant product is found to consist substantially entirely of a single phase silicon aluminium oxynitride having a rhombohedral crystal structure and obeying the approximate formula $SiAl_4O_2N_4$. Thus this material constitutes a different ceramic phase from the single phase compound based on the hexagonal $\beta$-phase silicon nitride lattice which constitutes the major constituent of the ceramic product of the invention. For the sake of convenience, this additional ceramic phase will hereafter be referred to as the phase 15R whereas the compound based on the hexagonal $\beta$-phase silicon nitride lattice will be identified by the reference character $\beta'$.

After removal from the graphite pot, the sintered mass of the 15R product is jaw crushed and then cone ground to an average particle size of 7 microns. 14.25 parts by weight of the ground 15R product is then mixed with 85.75 parts by weight of silicon nitride powder having a mean particle size of 2 microns and containing 89% by weight of the $\alpha$-phase material together with 4% by weight of silica as an inherent impurity, and 7 parts by weight Yttria powder as supplied by Rare Earth Products Limited with a particle size of the order of 1 micron. Mixing is effected in a colloid mill using isopropyl alcohol as the carrier liquid and, after six passes through the mill, the mixture is sieved using a sieve having a mesh size of 150 microns. After sieving, the mixture is cold isostatically pressed to the required shape in a rubber bag at 20,000 p.s.i. so as to produce a preform, which in one practical embodiment had a green density of 1.6 g.cm$^{-3}$. The resultant preform is then provided with a surface coating of silica together with 50% by weight of boron nitride, the coating having a thickness of between 0.01 and 0.02 inch. The coating materials are applied to the preform as a suspension in a mixture of iso-butyl-methyl-ketone with between 5 and 10% by volume of collodion, the suspension containing 40% by weight of solids. The coated preform is then buried in boron nitride powder contained in a graphite pot and heated, without the application of pressure, to a sintering temperature of 1840° C. over a period of eighty minutes. The preform is then held at this temperature for a further sixty minutes to produce the required ceramic product which, after natural cooling to room temperature, is removed from the graphite pot. In said one practical embodiment, the resultant product was found to have a mean modulus of rupture value at 25° C. of 810 MNm$^{-2}$ and a density of 3.208, the total weight loss during production of this product being 2%. Moreover, during the final sintering operation, it was found that the 15R material and silicon nitride had been converted to the required $\beta'$ phase with z being between 0.6 and 0.7, so that the latter constituted in excess of 90% by volume of the final sintered product. Transmission electron microscopy examination showed the product to contain a glass phase, identified as containing yttrium in an amount of the order of 10% by volume.

After the final sintering operation, the ceramic product is surface ground and then honed to provide a satisfactory surface finish.

As shown in FIG. 1, when the tool tip described is used to effect a single point turning operation on a rotating workpiece, such as that shown at 14 in the drawing, the tip 11 is trapped in the jaws of a suitable holder 15 which is held relative to the workpiece 14 so that one cutting edge 13 of the tip 11 is urged against the workpiece to present an entering angle of 60° of the workpiece. Moreover, the holder 15 is held relative to the workpiece so that the tip has a negative top rake of 6° and a front clearance of 6°, this arrangement of the holder being in accordance with the International Standards Organisation designation CSENL 3225M12.

To illustrate the properties of the tool tip 11, the component produced according to said one practical embodiment was employed in a single point machining operation on a circular disc formed of Meehanite cast iron. To effect machining, the workpiece was rotated about its axis at a surface rotational speed of 1880 ft/min and the tip 11 was fed axially at a rate of 0.01 inch/revolution so as to produce a cut 0.375 inch deep in the cylindrical surface of the disc. The same process was repeated with a proprietary alumina cutting tool tip normally recommended for machining this type of cast iron and it was found that the tool tip 11 exhibited a considerably lower wear rate. In addition the process was repeated using a conventional flood coolant and it was found that, whereas the tool tip 11 suffered no adverse affect, the proprietary alumina tool tip immediately shattered.

Referring to FIG. 2, the tool tip of the second example is indicated at 21 and is formed from the same material as the tool tip of the first example. The tip 21 is, however, shaped so as to generally define the frustum of a right pyramid having a base length of 12.7 mm and a height of 3.18 mm. The base 22 of the pyramid is rounded at each of its four corners so as to define four cutting edges each lying on a circle of radius 1.2 mm. As in the previous example, therefore, the tip 21 is indexable between four angularly spaced cutting positions in each of which one of said cutting edges is presented to the workpiece being machined. Moreover, the pyramid defined in part by the tip 21 has an included angle of 22° and hence each cutting edge is defined between the base 12 and a side surface of the tip inclined at an angle of 79° to the base. It is to be appreciated that the tip 21 complies with the International Standards Organisation designation SPGN 120312.

As shown in FIG. 2, when the tool tip 21 is used to effect a turning operation on a rotating workpiece, such as that shown at 23 in the drawing, the base 22 and the opposite major surface of the tip are trapped in the jaws of a suitable holder 24. The holder 24 is held relative to the workpiece so that one cutting edge of the tip is urged against the workpiece to present an entering angle of 75° to the workpiece. Moreover, the holder is presented to the workpiece so that the tip 21 has a positive top rake of 5° and a front clearance of 6°, this arrangement of the holder being in accordance with the International Standards Organisation designation CSBPR 2525M12.

To illustrate the properties of the tool tip of the second example, the tip was used to machine a cylindrical workpiece formed from EN 31 steel (i.e. 0.9–1.2% by weight carbon, 0.1–0.35% by weight silicon, 0.3–0.75% by weight manganese and 1.0–1.6% chromium, the remainder being iron), which had been hardened to 58 Rockwell C, such a material being employed in the calendering rolls of steel rolling mills. The workpiece was 8" in length and 4" in diameter and a radial thickness of 0.075 inches was successfully removed from the entire length of the workpiece in a single operation when the surface rotational speed of the workpiece during machining was 120 ft/minute and a cut depth of up to 0.1 inch. By way of contrast, using a conventional titanium nitride-coated tungsten carbide tool tip designed for high performance with ferrous materials, e.g. the tip supplied by Kennometal as type KC 810 it was found that the tool tip broke up on contact with the workpiece.

In a further practical embodiment the tool tip of the second example was used to machine a cylindrical workpiece formed from EN8 steel (i.e. 0.35–0.45% by weight carbon, 0.6–1.0% by weight manganese, and 0.05–0.35% by weight silicon). The workpiece was rotated about its axis at a surface rotational speed of 500 ft/minute and the tip 21 was fed axially at a rate of 0.009 inch per revolution so that the tip effected a cut 0.1 inch deep in the cylindrical surface of the workpiece. After machining, the cutting edge of the tip 21 was substantially undamaged, whereas when the same process was repeated with a conventional tungsten carbide tool tip used for general purpose steel cutting, such as that supplied by Sandvik as type S4, it was found that the tungsten carbide tip exhibited cratering at the cutting edge. Moreover, the tool tip 21 showed considerably less flank wear than the tungsten carbide tip.

In yet a further embodiment, the tool tip 21 was used to machine a cylindrical workpiece formed from annealed M2 high speed steel (i.e. 6–6.75% by weight tungsten, 4.75–5.5% by weight molybdenum, 3.75–4.5% by weight chromium, 1.7–2.05% by weight vanadium, 0.8–0.9% by weight carbon and 0.6% by weight cobalt). The workpiece was rotated about its axis at a surface rotational speed of 300 ft/minute and the tip 21 was fed axially at a rate of 0.009 inch/revolution so that the tip effected a cut 0.1 inch deep in the cylindrical surface of the workpiece. After machining, the cutting edge of the tip was substantially undamaged, whereas a Sandvik S4 tungsten carbide tool tip showed substantial cratering and flank wear when used to perform a similar machining process.

The same operation was repeated with the tool tip 21 being tilted so as to have a negative top rake and with the surface rotational speed of the workpiece being decreased to 200 ft/minute. The tool tip 21 again performed better than its tungsten carbide counterpart when used in the same orientation, but exhibited more wear than when used with a positive top rake.

In a modification of the above examples, a number of tool tips of the kind shown in FIGS. 1 and 2 were produced from a mixture consisting of 57.15 parts by weight of aluminium, 9.05 parts by weight of silicon and 33.80 parts by weight of alumina. The mixture was nitrided according to the procedure employed in the first example to produce an intermediate consisting substantially entirely of single phase silicon aluminium oxynitride having a rhombohedral crystal structure and obeying the approximate formula $SiAl_6O_2N_6$. Again this material, which for the sake of convenience will hereafter be referred to as the phase 21R, constituted a different ceramic phase from the material $\beta'$.

After jaw crushing and cone grinding in the manner of the first example, one sample of the 21R product was mixed with the silicon nitride and yttria powders of the first example, while four additional samples were mixed with the same silicon nitride and yttria powders and with a respective rare earth metal oxide chosen from lanthanum oxide, cerium oxide, prascodymium oxide, and neodymium oxide. Each of said rare metal oxides was in the form of a powder having a particle size of about 1 micron and each sample consisted of 7.5 parts by weight of the ground 21R product, 92.5 parts by weight of the silicon nitride powder, 7 parts by weight of yttria powder and, in the case of the four additional samples, 1 part by weight of the respective rare earth metal oxide. In each case, the samples were processed as in the first example, except that the sintering temperature was reduced to 1800° C., to give products having the properties detailed in the following Table.

| Sample No. | Rare Earth Oxide in Sample | Modulus of Rupture of Product (MNm$^{-2}$) | Density of Product | Weibull Modulus | Z value of |
|---|---|---|---|---|---|
| 1 | — | 667 | 3.221 | 15 | 0.54 |
| 2 | Lanthanum oxide | 606 | 3.202 | 12 | 0.54 |
| 3 | Cerium oxide | 561 | 3.219 | 12 | 0.54 |
| 4 | Praseodymium oxide | 635 | 3.190 | 7 | 0.54 |
| 5 | Neodymium oxide | 650 | 3.215 | 17 | 0.54 |

After surface grinding and honing, the products were found to be suitable for use as cutting tool tips.

We claim:

1. A cutting tool tip formed at least at a cutting edge of the tip from a ceramic product consisting essentially of at least 75% by volume of a single phase compound having an expanded $\beta$-phase silicon nitride lattice and having the general formula $Si_{6-z}Al_zN_{8-z}O_z$, wherein $0<z\leqq 5$ and a second phase containing at least one rare earth metal selected from the group consisting of yttrium, lanthanum, cerium, neodymium, praseodymium and scandium, the ceramic product being produced by sintering a starting mixture consisting essentially of silicon nitride, a silicon aluminium oxynitride other than said expanded $\beta$-phase silicon nitride, and at least one oxide of a rare earth metal.

2. A tool tip according to claim 1, wherein said silicon aluminum oxynitride other than said expanded $\beta$-phase silicon nitride is substantially a single phase having a rhombohedral crystal structure and the approximate formula $SiAl_4O_2N_4$.

3. A tool tip according to claim 1, wherein said silicon aluminum oxynitride other than said expanded $\beta$-phase silicon nitride is substantially a single phase having a rhombohedral crystal structure and the approximate formula $SiAl_6O_2N_6$.

4. A cutting tool tip according to claim 1, wherein said cutting edge of the tip is formed from a ceramic product consisting essentially of at least 85% by volume of a single phase compound having an expanded $\beta$-phase silicon nitride lattice and having the general formula $Si_{6-z}Al_zN_{8-z}O_z$, wherein $0<z\leqq 1$ and a second phase containing at least one rare earth metal selected from the group consisting of yttrium, lanthanum, cerium, neodymium, praseodymium and scandium, said second phase being a glass phase with said metal being present as a metal silicate, the ceramic product being produced by sintering a starting mixture consisting essentially of silicon nitride, a silicon aluminum oxynitride other than said expanded $\beta$-phase silicon nitride, and at least one oxide of a rare earth metal, said silicon aluminum oxynitride other than said expanded $\beta$-phase silicon nitride is substantially a single phase having a rhombohedral crystal structure and the approximate formula $SiAl_4O_2N_4$.

5. A cutting tool tip according to claim 1, wherein said cutting edge of the tip is formed from a ceramic product consisting essentially of at least 85% by volume of a single phase compound having an expanded $\beta$-phase silicon nitride lattice and having the general formula $Si_{6-z}Al_zN_{8-z}O_z$, wherein $0<z\leqq 1$ and a second phase containing at least one rare earth metal selected from the group consisting of yttrium, lanthanum, cerium, neodymium, praseodymium and scandium, said second phase being a glass phase with said metal being present as a metal silicate, the ceramic product being produced by sintering a starting mixture consisting essentially of silicon nitride, a silicon aluminum oxynitride other than said expanded $\beta$-phase silicon nitride, and at least one oxide of a rare earth metal, said silicon aluminum oxynitride other than said expanded $\beta$-phase silicon nitride is substantially a single phase having a rhombohedral crystal structure and the approximate formula $SiAl_6O_2N_6$.

6. A tip as claimed in claim 1, wherein the expanded $\beta$-phase compound having the general formula $Si_{6-z}Al_zN_{8-z}O_z$ is present in an amount of at least 85% by volume.

7. A tip as claimed in claim 1, wherein the z value of the expanded $\beta$-phase compound having the general formula $Si_{6-z}Al_zN_{8-z}O_z$ is greater than 0 and less than or equal to 1.0.

8. A tip as claimed in claim 1, wherein said second phase is a glass phase with said metal being present as a metal silicate.

9. A tip as claimed in claim 1, wherein the ceramic product is produced by a sintering operation in the absence of applied pressure.

10. A cutting tool including a tool tip as claimed in claim 1 and a holder having jaws between which opposite generally flat faces of the tip are clamped.

* * * * *